(12) United States Patent
Spells et al.

(10) Patent No.: US 7,467,351 B1
(45) Date of Patent: Dec. 16, 2008

(54) LAYERED MASTER PAGES

(75) Inventors: David Spells, Sachse, TX (US); Fan Yu, Allen, TX (US); David Halpin, Richardson, TX (US)

(73) Assignee: Adobe Systems Incorporated, San Jose, CA (US)

( * ) Notice: Subject to any disclaimer, the term of this patent is extended or adjusted under 35 U.S.C. 154(b) by 1548 days.

(21) Appl. No.: 10/062,576

(22) Filed: Jan. 31, 2002

(51) Int. Cl.
*G06F 17/00* (2006.01)
(52) U.S. Cl. ....................................... 715/243
(58) Field of Classification Search .................. 715/517, 715/243
See application file for complete search history.

(56) References Cited

U.S. PATENT DOCUMENTS

| | | | | |
|---|---|---|---|---|
| 5,873,106 A | * | 2/1999 | Joseph | 715/506 |
| 6,023,715 A | * | 2/2000 | Burkes et al. | 715/514 |
| 6,813,746 B1 | * | 11/2004 | O'Shea | 715/517 |
| 2003/0014442 A1 | * | 1/2003 | Shiigi et al. | 707/513 |

OTHER PUBLICATIONS

Mircosoft Press Computer Dictionary, Third Edition, Copyright 1997 Microsoft Corp.; pp. 55, 88, 93, 170, 187, 222, 223, 245, 246, 349, 356, 432, 465.*

Mok Oh, et al. "Image-based modeling and photo editing." Proceedings of the 28th annual conference on Computer graphics and interactive techniques, published 2001, p. 433-442.*

* cited by examiner

*Primary Examiner*—Doug Hutton
*Assistant Examiner*—Amelia Rutledge
(74) *Attorney, Agent, or Firm*—Fulbright & Jaworski L.L.P.

(57) ABSTRACT

A system and method for providing layered master pages in page layout or illustration software comprises basing a layered page of a document on a layered master page to provide a child page. The objects disposed on the layered master page are interleaved with the objects disposed on the document page and output as a child page. The resultant child page image has objects on layers of the layered master page interleaved with and/or among objects on layers of the document page.

51 Claims, 8 Drawing Sheets

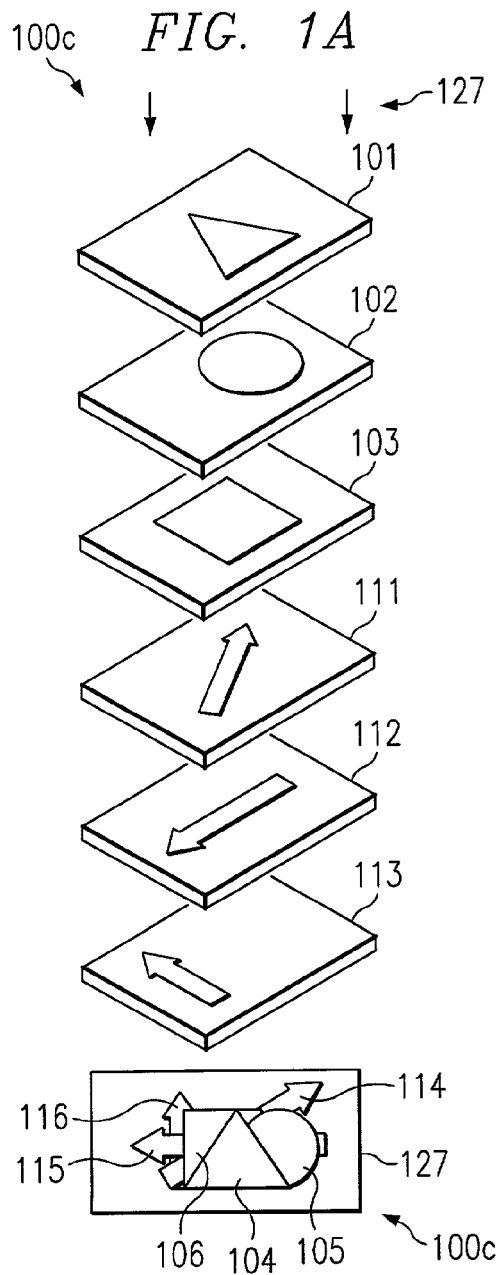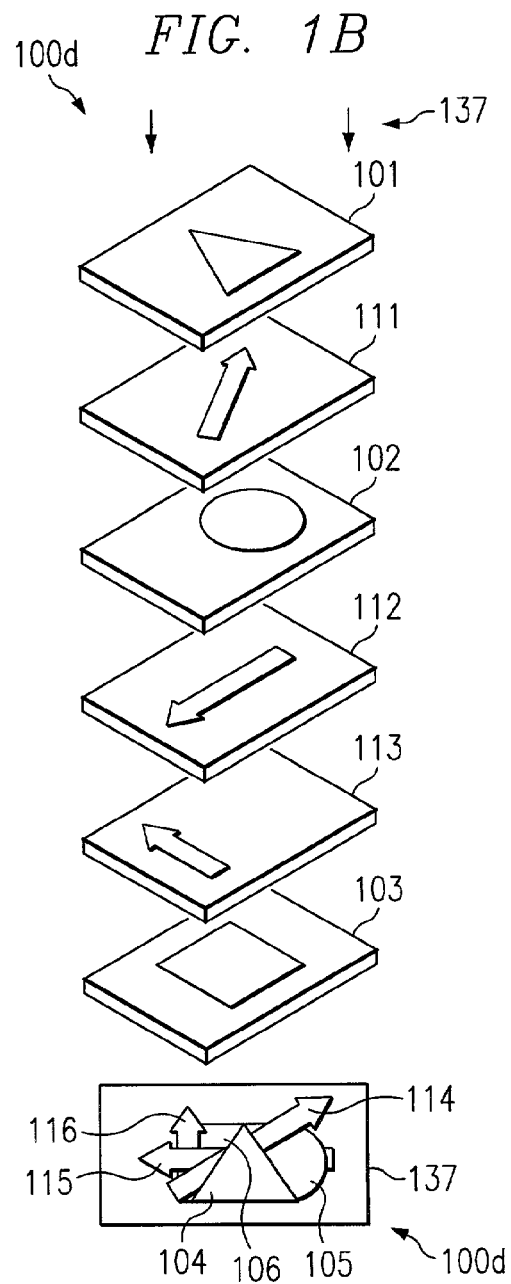

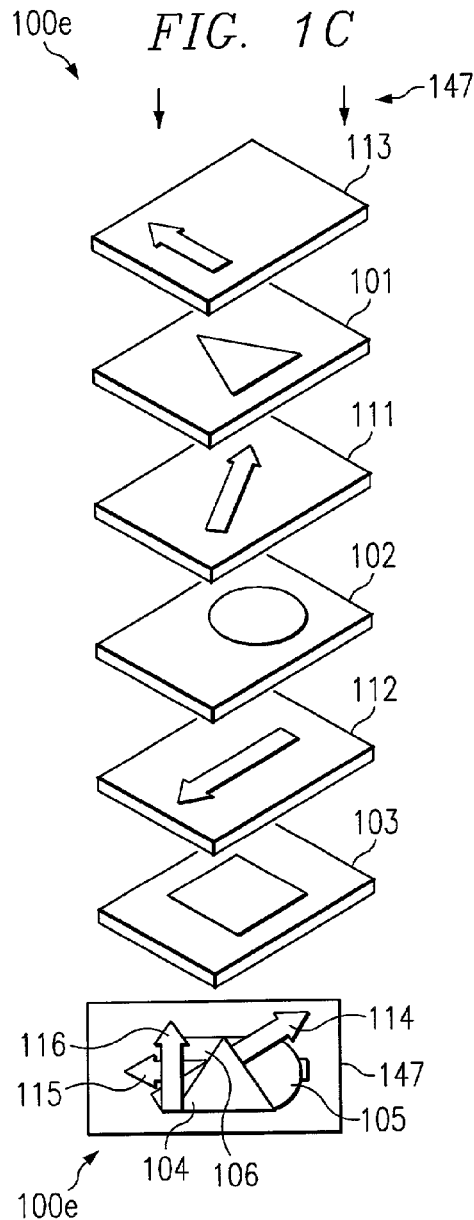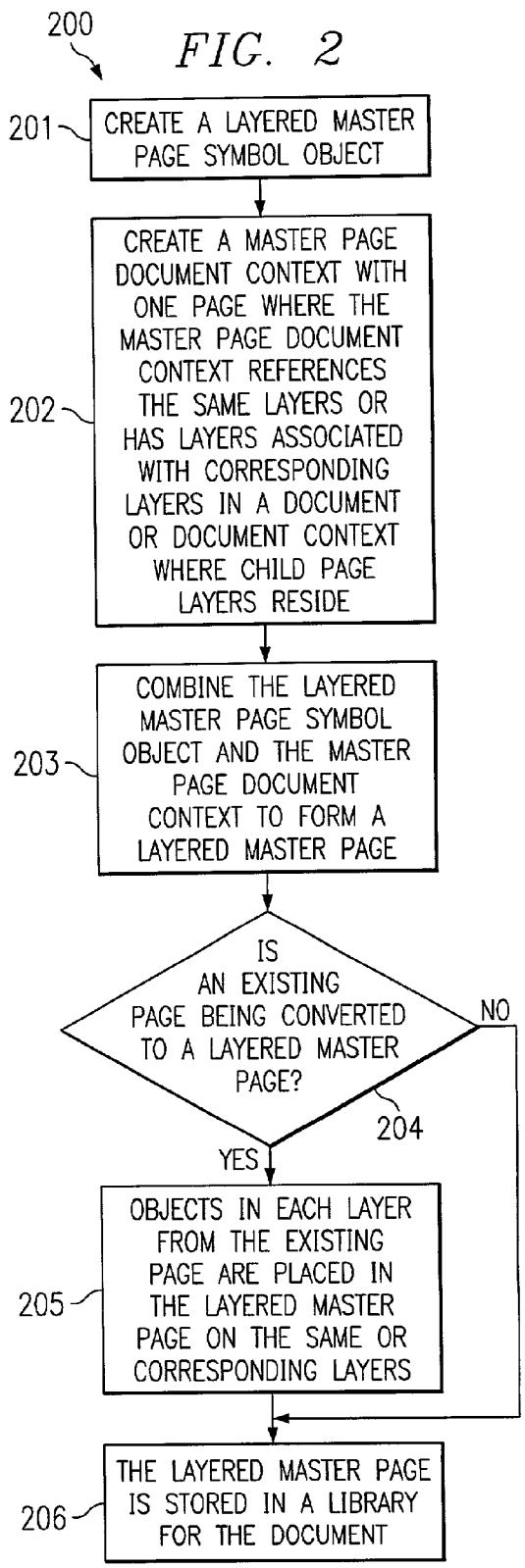

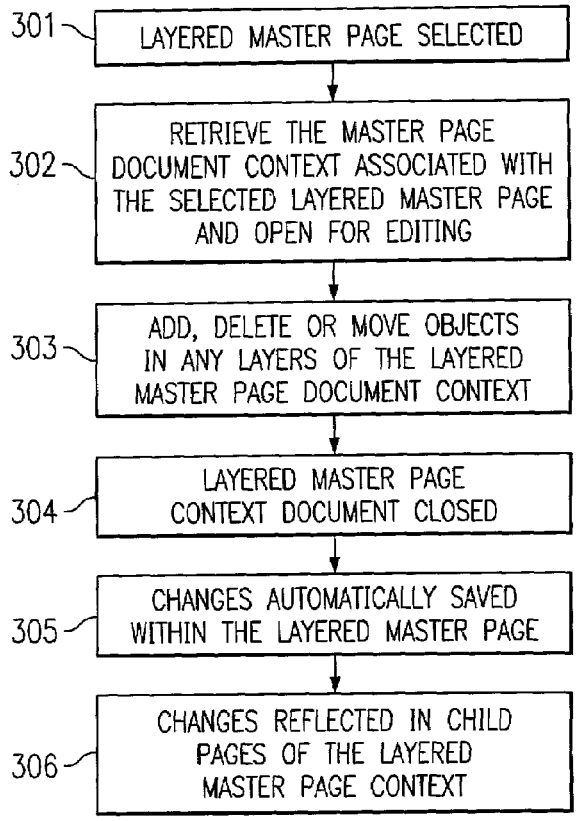
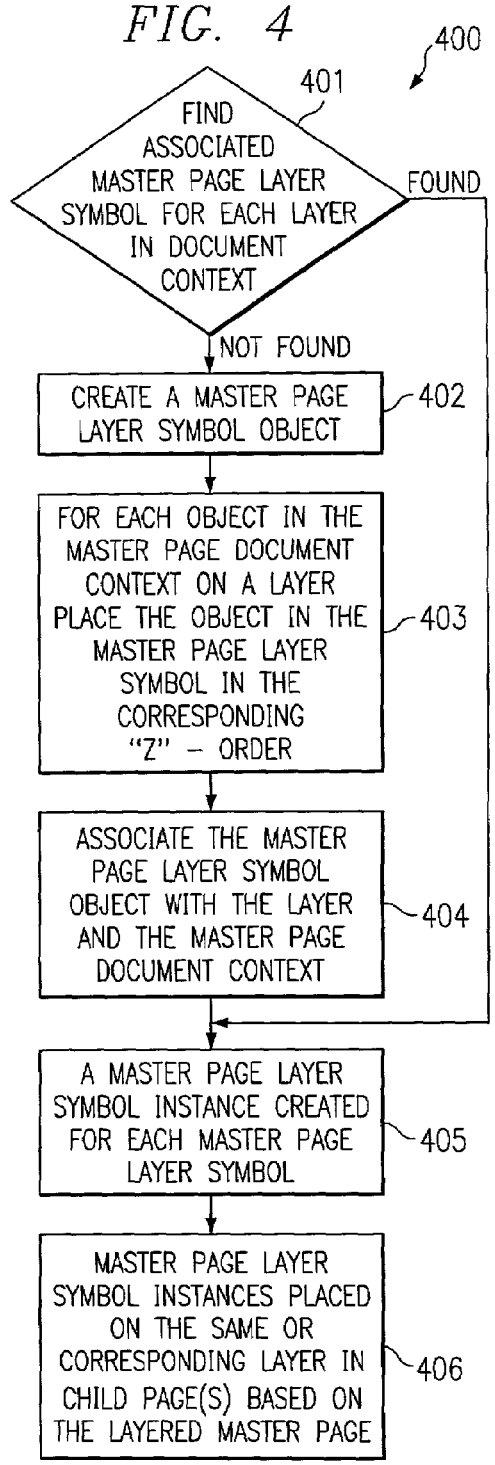
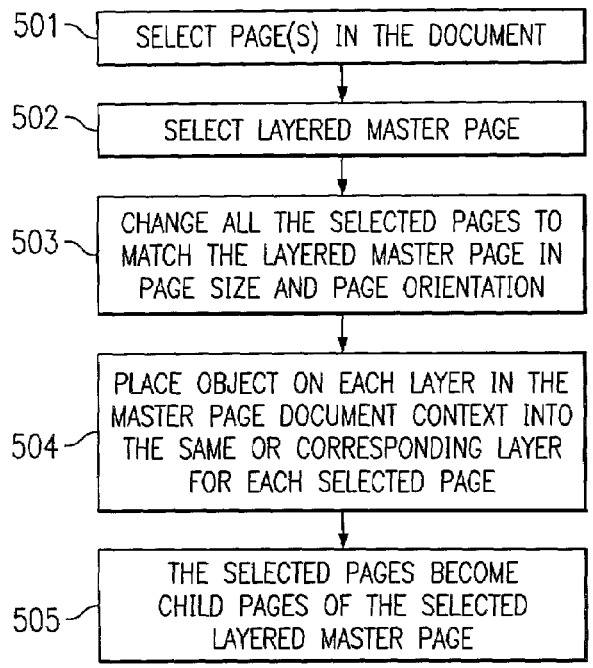

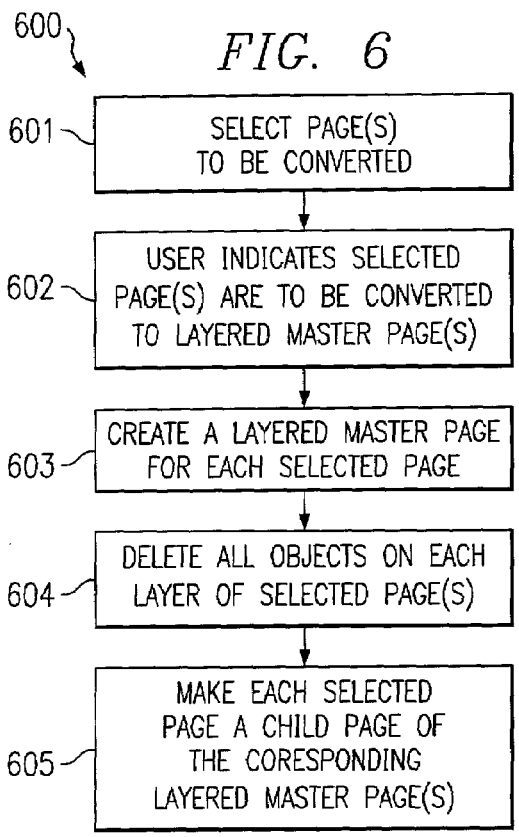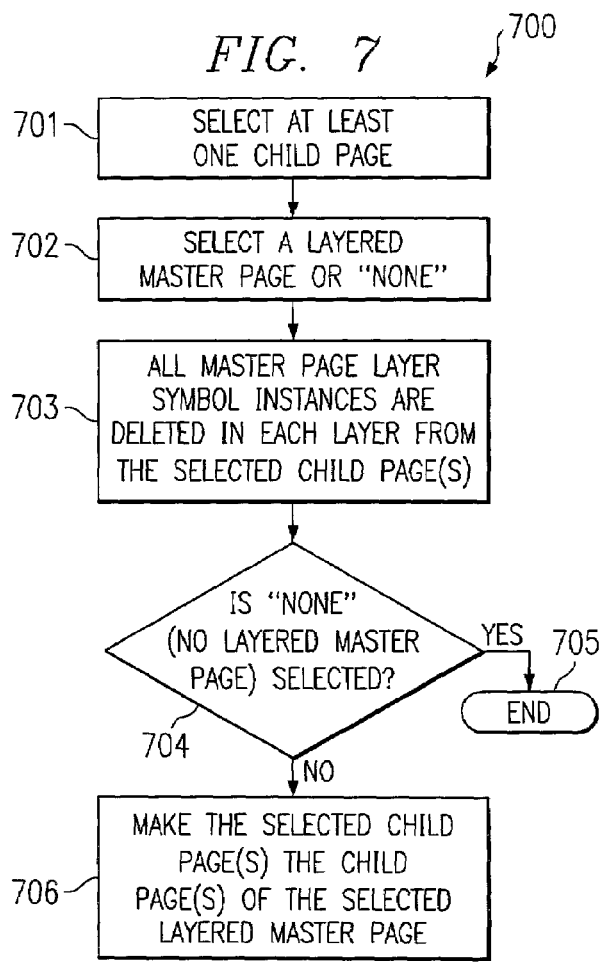

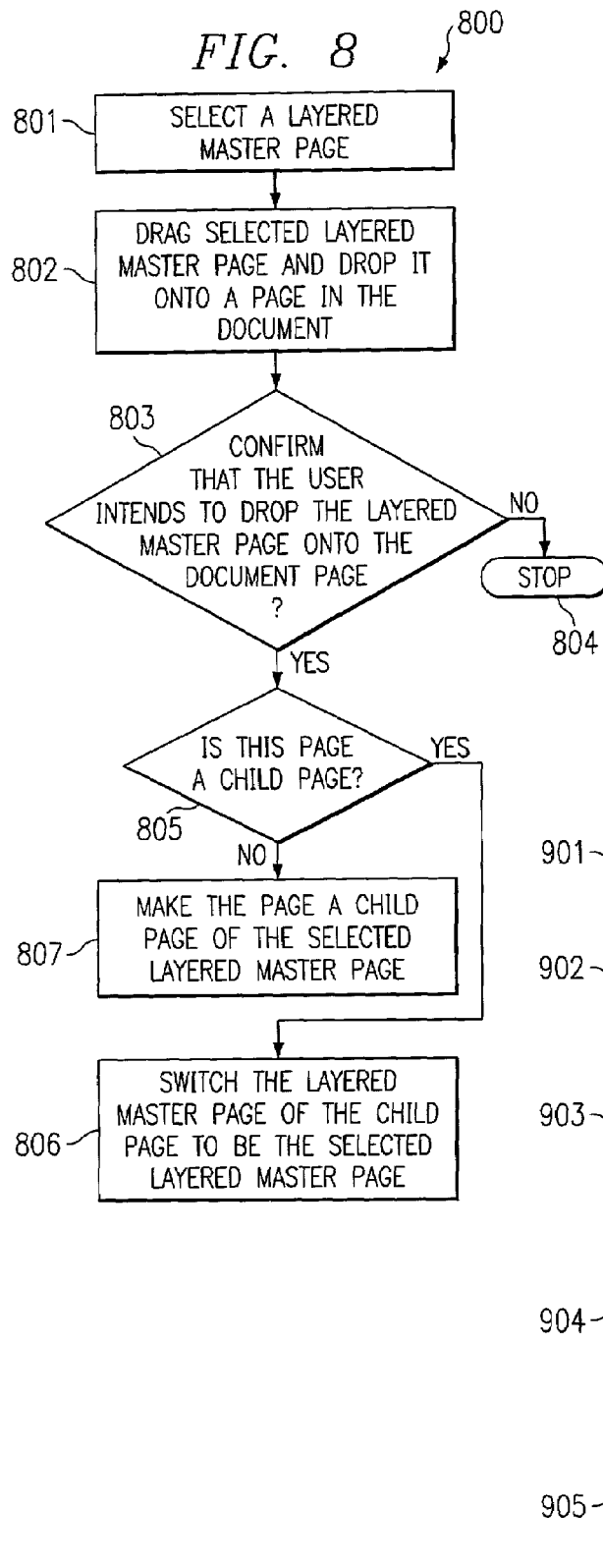
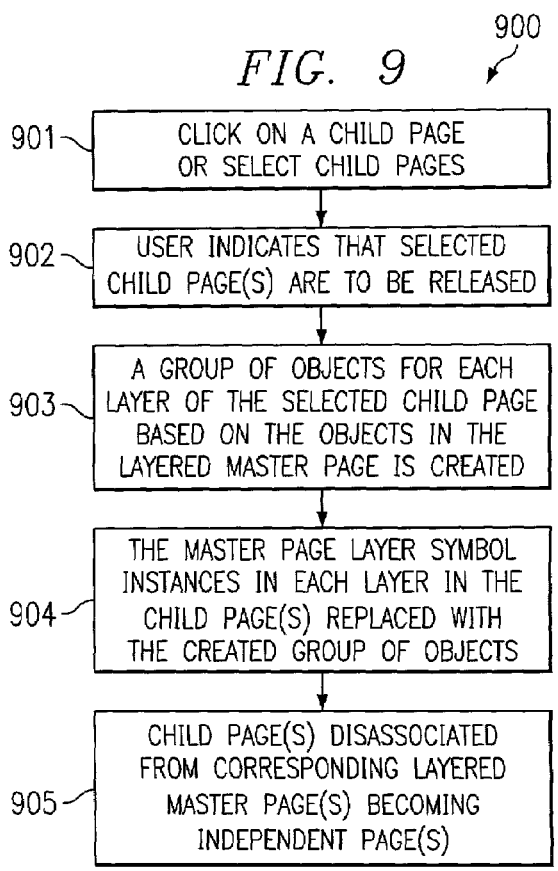

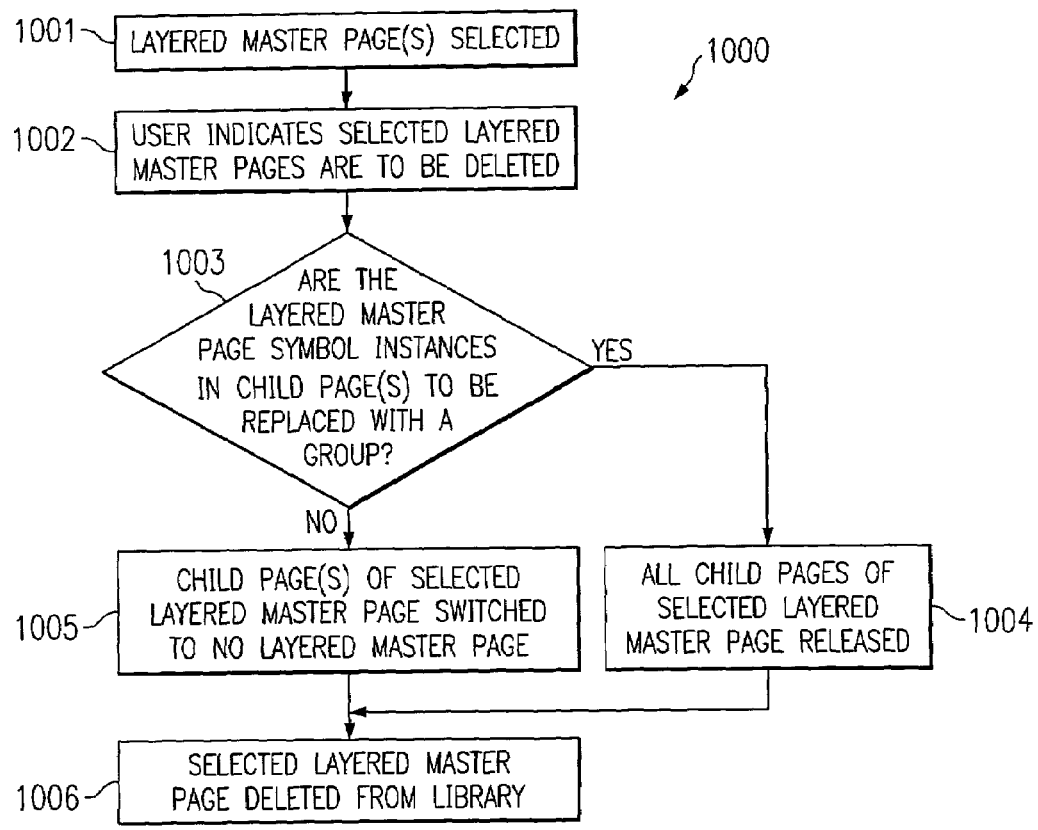
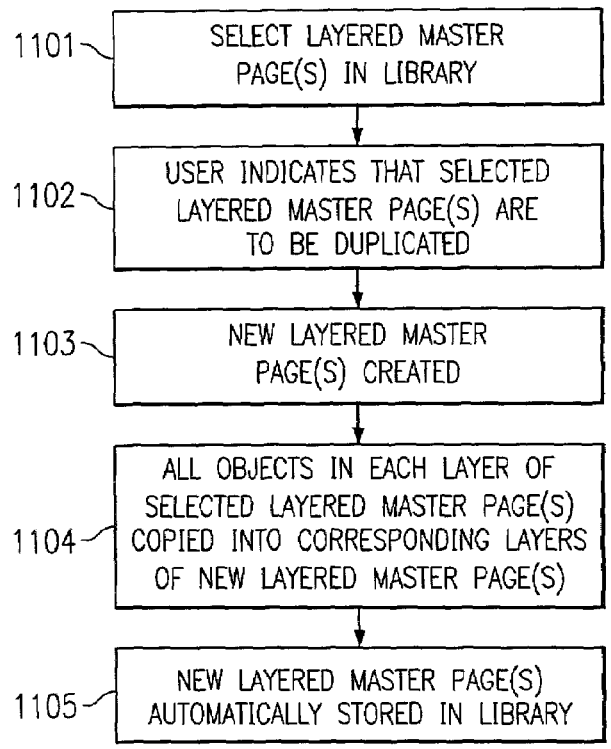

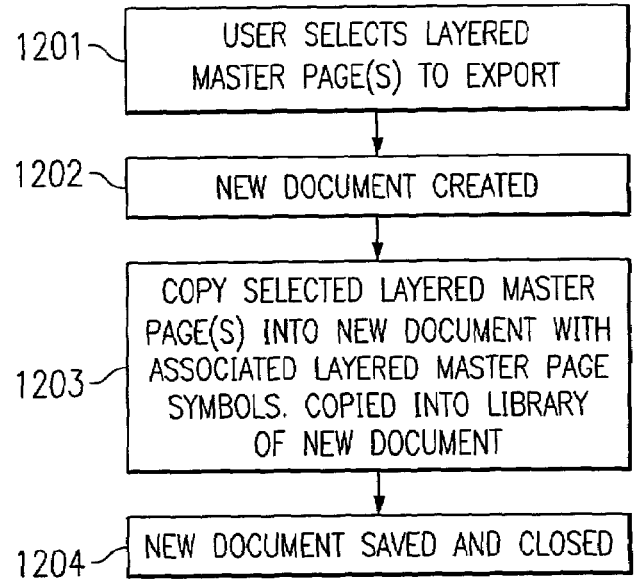
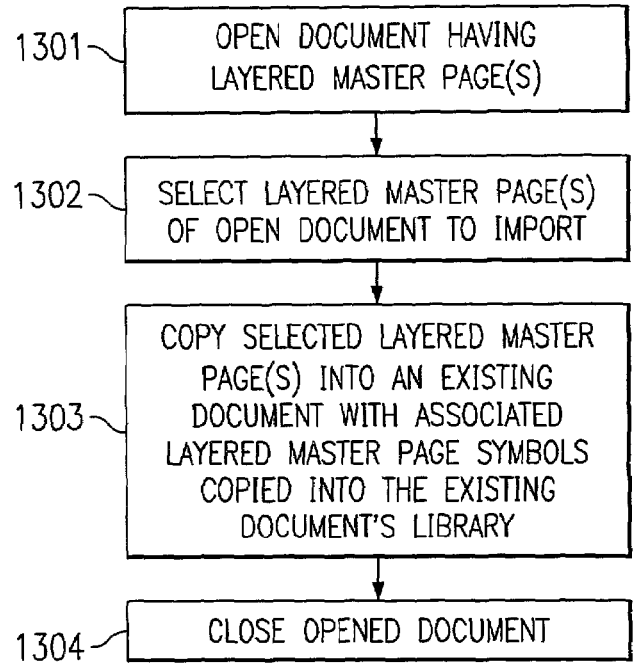

LAYERED MASTER PAGES

FIELD OF THE INVENTION

Generally, the present invention relates to page-layout and illustration software. Specifically, the present invention is a system and method for interleaving elements of master pages with elements of child pages based on these master pages.

BACKGROUND OF THE INVENTION

In traditional page-layout and illustration programs, a master page is a component that allows a user to have a common background or foreground, or other common elements on multiple pages. With existing implementations, a user creates a master page having one or more elements and when child pages are created based on the master page, all those master page elements appear in one layer, in the "Z"-ordering or depth of the drawing context, generally in the background of the illustration. In the prior art, the order in which the elements are rendered is relatively inflexible. Typically, the master page elements are rendered first, and on top of those master page elements, all the child elements are rendered. Problematically, the prior art fails to allow interleaving of child page elements and master page elements. In the prior art, master pages have layers, but these master page layers are typically independent of the child page layers and the two sets of layers do not interrelate nor may they be interleaved. So, in the prior art all master page elements, regardless of the layer of the master page on which they are disposed, typically appear underneath all of the child page layers and the child page layers' elements. Therefore, when using prior art page-layout programs it is not possible to create a child page where master page elements appear in different levels of the drawing context.

Another problem in the prior art is an inability for master page elements to affect the rendering of a child page element by applying some effect to a child page element. Traditional prior art master pages fail to allow the creation of some complicated illustrations. Additionally, prior art programs typically will not allow a user to have multiple master pages associated with a child page. With a traditional rendering master page, each master page element is rendered prior to the child elements. Therefore, even if multiple master pages were employed, it would appear as if only one master page is underneath the child pages.

BRIEF SUMMARY OF THE INVENTION

The present invention is directed to systems and methods for layered master pages which allow insertion of elements disposed on the master page in whatever "Z"-order a user desires and have the elements appear in different positions on the child pages, using layers. Preferably, the layered master pages of the present invention may be employed consistently across multiple child pages. Additionally, the present invention gives the user of a page-layout program control of the layered master pages, which gives control of multiple pages at a time and enables organization of pages in a central control location by the user. The present invention also provides the user of a page-layout program control over interleaving of elements from the layered master pages with elements from the child page(s) based on the master page(s). Whereas the concept of layering objects in a drawing document is known in the art, interleaving elements in a master page with elements in a child page in accordance with the present invention is heretofore unknown in the art. To facilitate interleaving in the present invention, master page elements are preferably at the same hierarchical level of objects as child page elements.

In page-layout programs a definition of a class of objects may be designated a layer. That layer generally has some properties and attributes associated with it. A page in a page-layout program generally has a list of layers associated with the page. Therefore, one of the data structures inside of a page object is a list of layer objects. A layer object generally has a list of drawing objects, oftentimes in the form of shapes. These shapes are preferable programming objects or classes that render the actual end result drawing on a screen or to a printer. Thus, "objects" as used herein generally means drawing objects or elements that are generally found in page layout and illustration applications, or the like. Herein, a "page" refers to a program object that has a list of layers and a "layer" refers to a programming object that has a list of drawing object shapes or the like. A layered master page preferably has a list of layers as other pages have a list of layers. In the present invention, the master page and the child page share the same layer list. In the present invention, the list of layers does not necessarily have to reside on a child page, but a child page preferably has an ability to reference a list of layers for associated layered master page(s) and draw from the list of layers for the layered master page(s) onto the child page.

In accordance with the present invention, elements on master pages may be interleaved with child page elements, creating a child page that was not possible using prior art page-layout programs. Additionally, elements in a layered master page of the present invention can affect child page elements in ways that were not possible in the prior art. For example, a layered master page may be used to add a lens effect, transparency effect, smudge effect or the like to a child element underneath a master element. Thus in one embodiment of the present invention object instances on one of the master page layers is interleaved among objects on a corresponding layer of the child page. Further, the present invention provides an ability to have complex relationships between multiple master pages and a child page so that the hierarchy of page relationships can be manipulated to give a user an ability to create complex hierarchies of child-to-master page relationships. This ability to create complex child-to-master page relationships allows the user to have global control over areas of the child page. For example, if two master pages are associated with a child page, each master page can control certain aspects of the layered elements in the final rendered page, such as the background and/or the foreground.

To employ layered master pages in accordance with the present invention in a page-layout program, first a layered master page is created. Then a layer of the master page is edited to accomplish the user's purpose. Then the edited master page is applied to make a child page. Advantageously, the present invention provides that an update to a master page is concurrently rendered on the associated child page(s).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1A is a diagrammatic representation of the document of FIG. 1 with all layered master page layers disposed behind child page layers in accordance with an embodiment of the present invention and similar to the prior art;

FIG. 1B is a diagrammatic representation of the document of FIG. 1 with layered master page layers interleaved with child page layers in accordance with an embodiment of the present invention;

FIG. 1C is a diagrammatic representation of the document of FIG. 1 with layered master page layers interleaved in a different arrangement with the child page layers in accordance with an embodiment of the present invention;

FIG. 2 is a flowchart of a process for creating a layered master page in accordance with the present invention;

FIG. 3 is a flowchart of a process for editing a layered master page in accordance with the present invention;

FIG. 4 is a flowchart of a process for creating a child page of a layered master page in accordance with the present invention;

FIG. 5 is a flowchart of a process for placement of master page objects on layers in a child page in accordance with the present invention;

FIG. 6 is a flowchart of a process for converting an existing page into a layered master page in accordance with the present invention;

FIG. 7 is a flowchart of a process for switching the layered master page upon which a child pages is based, in accordance with the present invention;

FIG. 8 is a flowchart of a process for making a page a child page of a layered master page in accordance with the present invention;

FIG. 9 is a flowchart of a process for releasing a child page from an associated layered master page in accordance with the present invention;

FIG. 10 is a flowchart of a process for deleting a layered master page in accordance with the present invention;

FIG. 11 is a flowchart of a process for copying a layered master page in accordance with the present invention;

FIG. 12 is a flowchart of a process for exporting a layered master page in accordance with the present invention; and FIG. 13 is a flowchart of a process for importing a layered master page in accordance with the present invention.

DETAILED DESCRIPTION OF THE INVENTION

Figure 1:
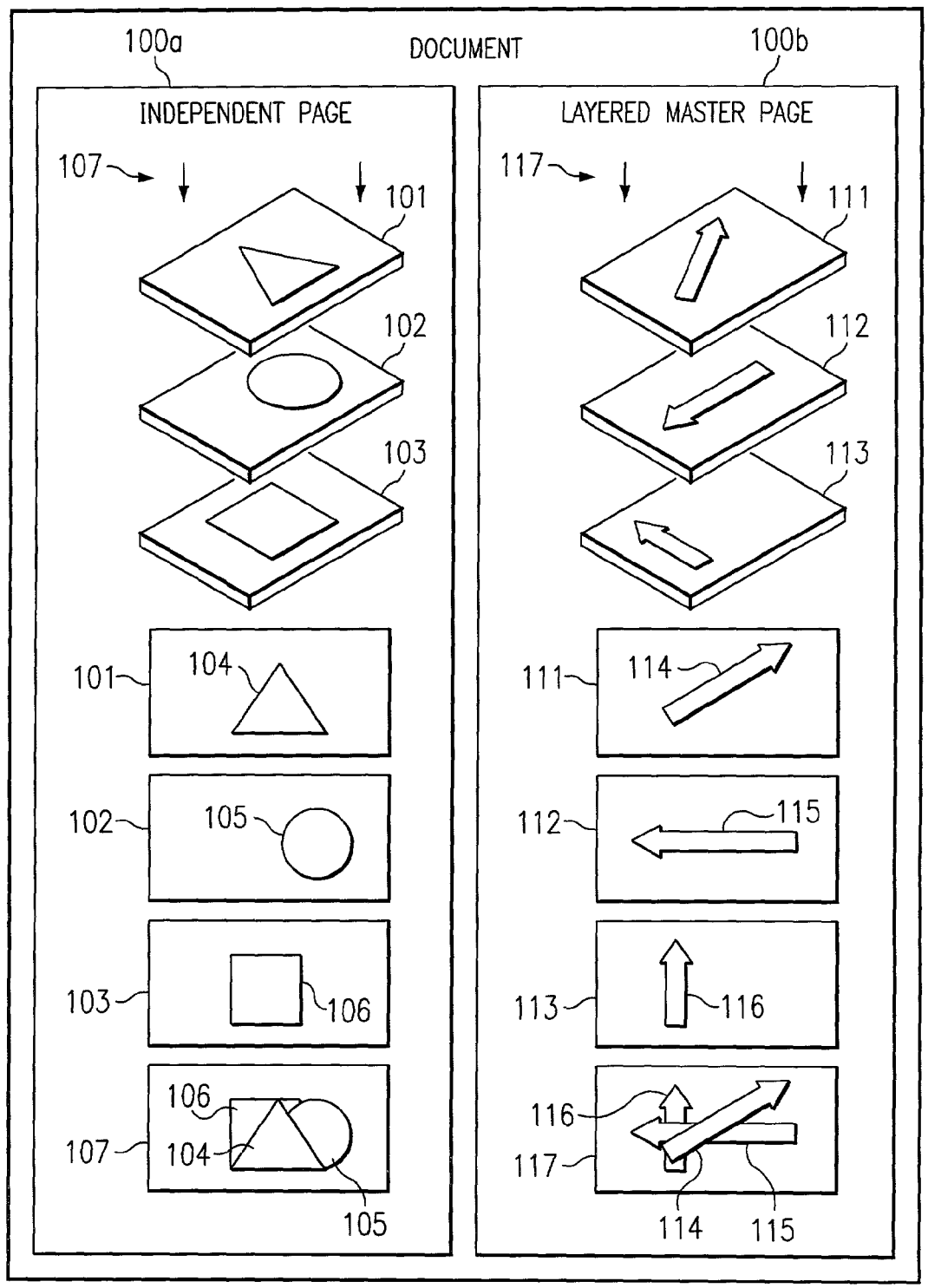
FIG. 1 is a diagrammatic representation of document having an independent page and a layered master page in accordance with an embodiment of the present invention.

A layered master page is a specific virtual pasteboard, or specific area of a virtual pasteboard, in a page-layout or illustration program where a user may place shapes to describe the elements of the layered master page. A layered master page is stored electronically or resides in memory apart from child pages of a document. This allows a user to describe layered master pages separately from child pages. In short, the layered master pages each have their own individual document context. In accordance with the present invention, one or more child pages can be based on, or reference, one or more layered master pages. The layered master page is a page object that has drawing objects that may be replicated across each child page associated with the layered master page. In accordance with the present invention, a child page is a page which inherits page information and object instances, in various layers, from a layered master page. Drawing objects may include, but are not limited to text objects, path objects, shape objects, image objects, effect objects, blend objects, clip objects, chart objects, imported file objects, extruded objects, page objects, guide objects, grid objects, and effect objects.

A document context, as used herein, is a special type of proxy (or surrogate) document that modifies the behavior of an original document, allowing the user to view and/or access different aspects of the document based on the "context". This allows the user to access the document by proxy through different document contexts using the same processes regardless of the definition of the individual document context, while allowing the user to achieve different results by accessing different data based upon an individual document context. In accordance with the present invention a document context may contain data that overrides data in the original document.

As used herein, a symbol is a special object that can be repeatedly referenced in a document. A reference to a symbol used in a document is called a symbol instance. A layered master page is a special symbol which is associated with a special document context that contains one page and multiple layers in which different kinds of objects can be placed.

A symbol class defines the description of all the shapes associated with a symbol. This allows creation of instances that refer back to the symbol class to provide the aforementioned symbol instance. All the shape objects in a symbol class can be output to a device, whether it is a printer or a screen, at a particular location on a page, with any applied transformations on the output shape object. In a drawing document there may be multiple instances of one symbol class. The symbol class may reference vector objects, bitmap objects, or the like. Preferably, only instances are drawn. But the symbol class preferably contains all the information needed to describe all the shapes for each instance.

In accordance with the present invention when an item or a shape is inserted into a layer, a symbol instance refers back to the symbol class. Whereas, the symbol class resides in the document, or related data structure, symbol instances reside in the page or document layers, which then can be drawn as pages. Such use of symbol classes saves storage space and memory capacity and provides an ability to change one object and have the change propagate throughout all symbol instances. Also, this facilitates the use of layered master pages in accordance with the present invention, allowing illustration of the same object on multiple pages.

A master page layer symbol is a special symbol that contains references to all the objects in one layer in a layered master page document context. A master page layer symbol instance is an instance of a master page layer symbol, which will be placed in the child page in the document. The present invention leverages these symbol instances to provide objects on the child layers as instances of these master page layers, so that the child page relationship to the layered master page symbol is made via these instances.

The present invention applies symbol classes to define a layered master page. In accordance with the present invention a layered master page may be considered a special symbol class. A symbol class can be referenced in multiple cases using instances as described above. Similarly, master page elements may be referenced multiple times in accordance with the present invention. Thus, layered master pages are a special symbol class because the master page's symbol class is associated with a layered document so that a user may, for example, add an object to the master page symbol class and that addition applies to all child pages based on the layered master page. So the layer that is on a child page is a virtual copy of the layer on the master page. However, when editing the master page the child page objects are not seen. Conversely, when editing the child page, the layered master page objects are seen and may be rendered first.

In accordance with the present invention, every shape in a layer preferably resides in a context. This context may be a "document management system." Therefore, in an embodiment of the present invention, an item may reside in the general document context while a second item may reside in a master page context. Preferably, this second item only exists in the master page. In accordance with the present invention, a user may interleave items that reside in multiple contexts. In this way, the present invention allows a user to interleave objects on a same layer, but the objects reside in separate contexts. Extending the example above, a first object may reside in a document, a second object may reside in a master page and a third object may reside in another master page, but the objects may all be interleaved together as the user desires. Furthermore, instances, which are also shapes or basic drawing objects, can reside in the document as well. Thusly, a master page layer class and a master page layer instance may reside in a single document.

In operation, all the items that are in, by way of example, layer one of master page one, are in a master page layer class that contains all of those items. Another master page class for all the items on layer two of master page one is maintained, and so on. So in accordance with the present invention, there is a master page class that exists for each one of the layers for each master page. So multiple master page layer classes result, one for each layer of each master page. Each child page has a master page layer instance for each one of the master page symbol classes, for the master page the child is based on. For example, if three child pages are based on master page one above, there will be one master page layer instance of master page one, layer one, for child page one; there will be one master page layer instance of master page one, layer one, for the second page that references master page one; and one master page layer instance of master page one, layer one, for child page three. Each child page will similarly have an instance associated with layer two of master page one. This results in a per layer, per master page, per child page hierarchy. Thus in accordance with the present invention, one embodiment enables object instances on one or more master page layers, or from more than one master page, to be interleaved among objects on a corresponding layer of one or more child pages. For example, instances of master page objects may be spatially positioned relative to child page objects on a corresponding, or same, layer through the use of arrange commands such as move to front, move to back, move back and move forward.

FIG. 1 diagrammatically represents document 100 having a layered master page 100b and an independent page 100a. Independent page 100a is comprised of three layers 101, 102, and 103. For purposes of illustration, layer 101 is shown having rectangle 104. Layer 102 is shown having offset circle 105. Square 106 is shown disposed on layer 103. View 107 taken through layers 101, 102 and 103 shows triangle 104 disposed over and partially obscuring circle 105 and square 106, while circle 105 partially obscures square 106. Turning to master page 100b, it is comprised of layers 111, 112 and 113. Angled arrow 114 is shown disposed on layer 111. Horizontal arrow 115 is shown disposed on layer 112 and offset vertical arrow 116 is shown disposed on layer 113. View 117 of layered master page 100b shows angled arrow 114 partially obscuring horizontal arrow 115 and vertical arrow 116. Horizontal arrow 115 is shown partially obscuring vertical arrow 116.

FIG. 1A shows page 100c. Child page layers 101, 102 and 103 are shown disposed above layered master page layers 111, 112, and 113. This arrangement of layers is consistent with the present invention as well as the prior art. Resultant view 127 shows triangle 104 disposed over and partially obscuring circle 105, square 106, angled arrow 114, horizontal arrow 115 and vertical arrow 116. In turn, circle 105 is disposed over and partially obscures square 106, angled arrow 114 and horizontal arrow 115. Square 106 is disposed over and partially obscures angled arrow 114, horizontal arrow 115 and vertical arrow 116. Angled arrow 114 and horizontal arrow 115 are shown as partially obscuring vertical arrow 116.

Conversely, in FIG. 1B, page 100d is shown with master page layers 111, 112 and 113 interleaved with child page layers 101, 102 and 103. For example, master page layer 111 is disposed between child page layers 101 and 102, while both master page layers 112 and 113 are disposed between child page layers 102 and 103. Therefore, view 137 of page 100d shows triangle 104 of child page layer 101 partially obscuring angled arrow 114. Both triangle 104 and angled arrow 114 partial obscure circle 105 disposed on child page layer 102. Circle 105 partially obscures horizontal arrow 115 which is disposed on child page layer 112. Vertical arrow 116, in turn, is partially obscured by elements which are disposed above it and intersect it, namely triangle 104, angled arrow 114 and horizontal arrow 115. Square 106 is disposed on layer 103 of the child page is partially obscured by all the other elements disposed on the child page and master page layers on this example.

Turning to FIG. 1C, page 100e shows disposition of a master page layer in the foreground. For example, master page layer 113 with vertical arrow 116 is disposed above child page layer 101 with triangle 104. Master page layer 111 with angled arrow 114 is disposed above child page layer 102 which contains offset circle 105. Arrow 102 is disposed above layer 112 on which horizontal arrow 115 is defined. In turn, layer 103 with square 106 is disposed below all other elements. Therefore, in view 147 vertical arrow 116 of master page layer 113 is shown partially obscuring triangle 104 of child page layer 101, angled arrow 114 of master page layer 111, horizontal arrow 115 of master page layer 112 as well as square 106 of layer 103.

The user experience preferably sees a layered master page in a list of symbols for an active document. A layered master page in the list represents a master page symbol class. Preferably the layered master page from the list can be dropped on a page and the layered master page will be applied to the page making it a child page of the layered master page. That resultant child page is preferably based on the selected master page symbol class.

FIG. 2 is a flow chart of process 200 in accordance with the present invention for creating a layered master page. In box 201 a special symbol object in the form of a layered master page symbol object is created. At box 202 a special, layered master page document context is created. This layered master page document context preferably has one page and the master page document context preferably references the same layers, or has layers which can be associated with the same layers, of the document or document context where the child page(s) reside. The symbol object and document context are combined to form a layered master page at box 203. Upon creation, nothing resides on the layered master page. At 204 the user is prompted to select whether an existing page is being converted to a layered master page. To convert an existing page to a layered master page all the objects in each layer from the existing page are copied into the same or corresponding layers in the layered master page document, at box 205. After conversion at box 205, or if no conversion is to take place at 204, the layered master page is stored at box 206, in a library, which contains a list of symbols.

Turning to FIG. 3, process 300 for editing layered master pages is flow charted. A layered master page is selected at box 301, preferably by either double clicking the layered master page, or as a menu item in an option pop-up menu. The document context with the selected layered master page document is retrieved and will preferably open at box 302 as a regular document with layers, but the layered master page document will preferably have only one page. Objects may be edited, for example added, deleted, moved, resized or transformed, at box 303. After any editing is complete, a user may close the layered master page document context at box 304. The master page is preferably automatically saved at box 305. If one or more child pages are associated with the layered master page context, the changes will automatically be made in the child pages at box 306.

FIG. 4 flow charts placement 400 of objects from a layered master page on a child page. As detailed above, a master page layer symbol instance is an instance of, or a reference to, a master page layer symbol. Such an instance is preferably placed in a corresponding layer of a child page document. Preferably, there will only exist one master page layer symbol instance per master page layer symbol, per child page. Preferably, there is one master page layer symbol per master page, per layer. A master page layer symbol is created based on the objects in one layer of a layered master page document. A determination is made at box 401 as to whether master page layer symbols for each layer in a document can be found. If a master page layer symbol has not been created for a layer, then it is created at box 402. As noted above, the master page layer symbol is based on the object(s) of a master page layer. For each object on each layer of the master page document context an object is placed in the master page layer symbol in the corresponding "Z"-order. These master page layer symbol object(s) are then associated at box 404 with a layer of the master page document context, particularly for future reference. At box 405, one page layer symbol instance for each master page layer symbol is created. Specifically, one master page layer symbol instance is created for each master page layer symbol and each child page, resulting in multiple master page layer symbol instances, one for each child page of the master page. At box 406, the symbol instances are placed on the same or corresponding layer(s) in the child page(s). The Cartesian location of the symbol instance on the child page should be the in the same relative position on the child page as the Cartesian location of the symbol on the master page. Preferably this Cartesian positioning is relative to a common fixed point of both the child and the layered master page, such as the bottom left hand corner of each page.

FIG. 5 flow charts process 500 for creation of a child page. Preferably, a user clicks on a page to make that page the current page at box 501, or a user may select one or more pages in the document using program menus. In accordance with the present invention, multiple child pages may be created at a time. At least one layered master page is selected at box 502, preferably from a list of layered master pages appearing in a pop-up menu or the like, which preferably pops-up when the current page(s) are selected at box 501. The user selects the layered master page(s) which the user wishes to base the selected page(s) on, making the page(s) selected at 501 child page(s) of the selected layered master page(s). The page(s) selected in 501 now become child page(s) of the master page(s) selected in 502. Preferably, the page(s) selected in 501 will be adapted at box 503, to match the layered master page size and orientation when a master page is selected at box 502. At box 504, instances of each master page document layer's objects are placed in the same or corresponding layers for each page selected at 501.

Turning now to FIG. 6, a flow chart of process 600 for converting an existing page into a layered master page is shown. At box 601, a user selects one or more pages to be converted, preferably by clicking on the page. The user indicates a desire to convert the selected page(s) to layered master page(s) at box 602. This is preferably done by selecting a menu item such as "convert to master page" in an option pop-up menu, which preferably appears upon page selection at box 601. At box 603 a layered master page based on each of the selected page(s) is created as discussed above and illustrated in FIG. 2, specifically steps 201 through 203. All the objects from the child page are moved to corresponding layers of the layered master page consistent with step 205 above. The objects are deleted in each layer of the child page, at box 604, as a part of moving the objects to the master page. The selected page accordingly becomes a child page of the layered master page at box 605. Preferably, the user will not see any difference in the what-you-see-is-what-you-get (WYSIWYG) displayed page because the objects deleted are replaced with layer instances of the objects now on the master page layers consistent with step 504 of FIG. 5 as described above. Consequently, a user can design a page and decide to designate the page as a master page at a later point in time by converting the page into a master page in accordance with process 600.

FIG. 7 is a flow chart of process 700 for switching layered master page for one or more child pages. Process 700 is used to change the layered master page upon which one or more child pages are based, or to select to have no master page for the child pages. At least one child page is selected at box 701, preferably by clicking on the page or selecting the child page(s) from a menu, thereby making the selected page(s) the active page(s). At box 702, a layered master page is selected from a pop-up menu or the like. Alternatively at box 702, an indication is made that the user wishes to have no master page associated with the selected child page(s), preferably by selecting a "none" option or the like. The selections made at boxes 701 and 702 preferably result in either changing the association or breaking the association of the selected child page(s) to its associated layered master page. To break or change the association, all the master page layer symbol instances in each layer from all the selected pages are preferably deleted at box 703. If at 704 a determination is made that no layered master page was selected at box 702 (i.e. "none" was selected at box 702), process 700 ends at box 705, as all associations have already been broken at box 703 and no master page is associated with the selected child page(s). If at 704 it is determined that a master page was selected at 702, the pages selected at 701 are made child pages of the selected layered master page at box 706 in accordance with steps 503, 504 and 505 of FIG. 5.

FIG. 8 is a flow chart of process 800 for making a page a child page by dragging and dropping a layered master page onto the page to be made a child page. At box 801, a layered master page upon which the user desires to base a child page on is selected. Preferably, the base layered master page is selected by clicking on it. At box 802, the layered master page is dragged onto the page which the user wishes to make a child page of the selected layered master page and the layered master page is dropped. At 803, the user is preferably prompted to confirm that the user wishes to drop the layered master page onto the page. If at 803 the user indicates that he or she did not intend to drop the layered master page onto the page, the process ends at 804. If at 803 the user confirms his or her intent to drop the master page on the page, the present system checks at 805 to see if the page is a child page of another master page. If it is determined at 805 that the page is a child of another master page, a switch of the layered master page to the present selected layered master page is carried out at box 806 in accordance with steps 703, 704 and 706 of FIG. 7, as described above. If it is determined at 805 that the page is not already a child page, the page is preferably made a child page of the selected layered master page at box 807 in accordance with steps 503, 504 and 505 of FIG. 5.

FIG. 9 is a flow chart of process 900 for releasing a child page. Process 900 is employed to break an association between a selected child page and its layered master page while maintaining the objects of the layered master page in the child page rather than deleting those objects from the child page. At box 901 a child page is selected preferably by clicking on the child page or selecting child page(s) by using a menu item, page tool or the like. Then at box 902 the user preferably indicates a desire to release the selected child page(s). This may be done by selecting a menu item in an option pop-up menu, or the like. Creation of a group of objects for each layer of the selected child page(s) based on the objects in the layered master page, is carried out at box 903. Therefore, these object(s) in the layers of the selected child page(s) are no longer instance(s). A group has been created which will have the same appearance as the master page object instances. The master page symbol instances in each layer of the selected child page(s) are replaced in each child page with a copy of this created group, box 904. The child page(s) are then disassociated from the corresponding layered master page(s) at box 905, and the child page(s) become independent page(s) having the corresponding created object group. Therefore, initially, the independent page(s) will have the same appearance as when based on the master page. However, when the master page is changed, it will no longer change the subject independent page(s). A stand alone, independent, page has been created that looks like the child page did when linked with the master page. So, all the objects on the created independent page can be modified, rather than requiring the user to return to the master page to edit items, and changes made to the objects in the independent page will have no effect on pages which are still child pages of the layered master page.

FIG. 10 is a flow chart of process 1000 for deleting layered master pages. Layered master page(s) are selected at 1001, preferably by clicking on a layered master page. The user indicates a wish to delete the layered master page(s) at box 1002. Preferably, a menu item in a pop-up menu, launched as a result of clicking on the layered master page in box 1001, is selected to indicate the user's desire to delete the layered master page. After deletion is selected at box 1002, a choice is made at 1003, preferably in a pop-up dialogue box, as to whether the user wishes to replace all the master page symbol instances in the child page with a group of objects. If the user answers yes at 1003, the child page(s) of the master page are released at box 1004 consistent with steps 903, 904 and 905 of FIG. 9, as described above. Therefore, if the user answers yes at 1003, instances of the master page elements on the active child page are replaced with an object group so that the page will look the same as it did when linked to the master page, before the master page is deleted at box 1006. If the user answers no at 1003, then the child page of the selected layered master page is switched to having no layered master page at box 1005, consistent with steps 703, 704 and 705 of FIG. 7, as described above. Then, at box 1006, the layered master page is deleted from the library.

FIG. 11 is a flow chart of process 1100 for copying layered master pages. One or more layered master pages in the document library are selected at box 1101, preferably by clicking on the layered master page. The user indicates a desire to duplicate the selected layered master page(s) at box 1102. This task is preferably carried out by selecting a menu item to duplicate the layered master page, preferably from a pop-up menu launched as a result of clicking on the layered master page at box 1101. A new layered master page is created at box 1103, and all the objects in each layer from the layered master page are copied into the same or corresponding layers of the new layered master page at box 1104. Preferably, the new layered master page is automatically installed in the library at box 1105 and appears in pop-up menus listing layered master pages available for use. The programming input in process 1100 is a layered master page symbol, or a layered master page description, and then the output is an exact copy of that layered master page description, while maintaining the original. Therefore, one copy of the layered master page may be edited while maintaining the original layered master page layout.

In accordance with the present invention, layered master pages may be exported for use by other users of the present inventive illustration and page-layout software. Export process 1200 for a layered master page is flow charted in FIG. 12. At box 1201 a user selects layered master page(s) to export. This can be accomplished by the user selecting an export menu item, which preferably precipitates opening of an option pop-up menu or dialog. Such an export dialog preferably lists all the symbols and master pages available in the document. In the export dialog, one or more layered master pages to be exported are selected. At box 1202 a new document is created in accordance with the present system and method. Preferably, at box 1203, the selected layered master page(s) and associated layered master page symbols are copied into the new document's library, with no child pages based on the layered master page(s). The new document is saved and then preferably closed at box 1204. Thereby, users may share master pages without the need to exchange entire illustration documents. This may be particularly useful in a corporate or enterprise environment where a standard document may be used as a standard letterhead, for example. In such a case, the layered master page embodying the standard layout may be exported, placed on a central server, and when a new document is started, the layered master page document maybe used as a template.

FIG. 13 flow charts import process 1300 for layered master pages. A user opens a document that contains layered master page(s) at box 1301. To accomplish this task a user may select an import menu item, or the like and an open file dialog box appears where the user may select a file that contains the layered master page(s) that the user wishes to import. As a result an import dialog will preferably open at box 1302 and the user preferably designates which layered master pages to import. At box 1303 the selected layer master page(s) from the newly opened document are copied into an existing document with the associated layered master page symbols copied into the library of the existing document in accordance with steps 1103, 1104 and 1105 of FIG. 11 as described above. At box 1304 the newly opened document is closed, preferably without saving. Therefore, in process 1300 for importing layered master pages, the input is a document selection then a selection of layered master pages from that document. So all the pages of the document need not be imported, allowing the selected pages to be copied into an existing or newly created document.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for laying-out and illustrating pages using a computer, said method comprising the steps of:
   creating a layered page in a document based on a layered master page;
   interleaving layers of said layered master page with layers of said created page; and
   outputting a combined image of said created page wherein objects in said layers of said created page interleave with objects on said layers of said layered master page.

2. The method of claim 1 wherein said created layered page is a child page of said layered master page.

3. The method of claim 1 wherein said objects comprise at least one object selected from the group consisting of:
   text objects;
   path objects;
   shape objects;
   image objects;
   effect objects;
   blend objects;
   clip objects;
   chart objects;
   imported file objects;
   extruded objects;
   page objects;
   guide objects;
   grid objects; and
   effect objects.

4. The method of claim 1 further comprising the step of interleaving object instances based upon objects on one of said master page layers is interleaved among objects on a corresponding layer of said child page.

5. The method of claim 1 further comprising the step of creating a layered master page by combining a symbol object with a multiple layer document having at least one page.

6. The method of claim 1 wherein said interleaving step further comprises the steps of:
   creating a master page layer symbol instance for each master page layer symbol; and
   placing layer symbol instances on corresponding layers in said created page.

7. The method of claim 1 further comprising the step of reflecting changes to said layered master page in said created page.

8. The method of claim 7 further comprising the step of automatically saving said changes.

9. The method of claim 1 further comprising the steps of making a selected page a child page of at least one selected layered master page.

10. The method of claim 9 wherein said making step further comprises the step of placing layer objects in said at least one selected layered master page into corresponding layers of said selected page.

11. The method of claim 9 wherein said making step further comprises the steps of:
   resizing said selected page to match size of said at least one selected layered master page; and
   orienting said selected page to match orientation of said at least one selected layered master page.

12. The method of claim 9 wherein said making step comprises the steps of:
   dragging said at least one selected layered master page onto said selected page; and
   dropping said at least one selected layered master page on said selected page.

13. The method of claim 12 wherein said making step further comprises the step of confirming an intention to drop said at least one selected layered master page onto said selected page.

14. The method of claim 9 wherein said making step further comprises the step of switching a layered master page said selected page is based upon to said at least one selected layered master page.

15. The method of claim 1 further comprising the step of converting a selected page into a layered master page.

16. The method of claim 15 wherein said converting step comprises the steps of:
   creating a layered master page based on said selected page;
   deleting objects in each layer of said selected page; and
   making said selected page a child page of said created layered master page.

17. The method of claim 1 further comprising the step of switching a layered master page on which a selected page is based to a selected layered master page.

18. The method of claim 17 wherein said switching step further comprises the step of deleting master layer symbol instances from each layer of said selected page.

19. The method of claim 18 wherein said switching step further comprises the step of making said selected page a child page of said selected master page.

20. The method of claim 1 further comprising the step of releasing a selected child page from a layered master page upon which said selected child page is based.

21. The method of claim 20 wherein said releasing step comprises the steps of:
   creating a group of objects for each layer of said selected child page based on objects in said layered master page upon which said selected child page is based;
   replacing master page symbol instances in said selected child page with said created group; and
   disassociating said selected child page from said layered master page upon which said selected child page is based.

22. The method of claim 1 further comprising the step of deleting a selected layered master page by replacing symbol instances in a child page of said selected layered master page with a group of objects based on objects in said selected layered master page and
    disassociating child pages of said selected layered master page from said selected layered master page.

23. The method of claim 1 further comprising the step of duplicating a selected layered master page.

24. The method of claim 23 wherein said duplicating step further comprises the steps of:
    creating a new layered master page; and
    copying objects in said selected layered master page into corresponding layers of said new layered master page.

25. The method of claim 1 further comprising the step of exporting at least one selected layered master page as a document.

26. The method of claim 1 further comprising the step of exporting a selected layered master page as a document comprised of only layered master pages.

27. The method of claim 1 further comprising the steps of importing at least one selected layered master page into a library of a current document.

28. A method using a computer and memory comprising:
    combining a layered document page with a layered master page to create a child page;
    interleaving layers of said layered master page with layers of said layered document page in said resultant child page; and
    outputting an image of said layered document page and said layered master page combined with objects on said layers of said layered document page interleaved with objects on said layers of said master page to present said child page.

29. The method of claim 28 wherein said objects comprise at least one object selected from the group consisting of:
    text objects;
    path objects;
    shape objects;
    image objects;
    effect objects;
    blend objects;
    clip objects;
    chart objects;
    imported file objects;
    extruded objects;
    page objects;
    guide objects;
    grid objects; and
    effect objects.

30. The method of claim 28 wherein object instances based upon objects on one of said master page layers is interleaved among objects on a corresponding layer of said layered document page.

31. The method of claim 28 further comprising:
    creating a layered master page by combining a symbol object with a multiple layer document having at least one page.

32. The method of claim 28 wherein said interleaving further comprises:
    creating a master page layer symbol instance for each master page layer symbol; and
    placing layer symbol instances on corresponding layers in said child page.

33. The method of claim 28 further comprising reflecting changes to said layered master page in said child.

34. The method of claim 28 further comprising changing said layer master page.

35. The method of claim 28 further comprising reflecting changes to said layered master page in said child page.

36. The method of claim 28 further comprising automatically saving changes to said layer master page.

37. The method of claim 28 wherein said combining comprises dragging and dropping said layered master page onto said layered document page.

38. The method of claim 37 wherein said combining further comprises confirming an intention to drop said layered master page onto said layered document page.

39. The method of claim 28 further comprising switching said layered master page to another layered master page.

40. The method of claim 28 wherein said combining comprises placing layer objects of said layered master page into corresponding layers of said layered document page.

41. The method of claim 40 wherein said combining further comprises:
    resizing said layered document page to match size of said layered master page; and
    orienting said layered document page to match orientation of said layered master page.

42. The method of claim 28 further comprising switching a layered master page on which said child page is based to another layered master page, said switching comprising deleting master layer symbol instances from each layer of said child page.

43. The method of claim 42 wherein said switching further comprises making said child page a new child page of said another layered master page.

44. The method of claim 28 further comprising releasing a selected child page from a layered master page.

45. The method of claim 44 wherein said releasing comprises:
    creating a group of objects for each layer of said selected child page based on objects in said layered master page upon which said selected child page is based;
    replacing master page symbol instance in said selected child page with said created group; and
    disassociating said selected child page from said layered master page upon which said selected child page is based.

46. The method of claim 28 further comprising deleting a selected layered master page, said deleting comprising:
    replacing symbol instances in child pages of said selected layered master page with a group of objects based on objects in said selected layered master page; and
    disassociating child pages of said selected layered master page from said selected layered master page.

47. The method of claim 28 further comprising duplicating a selected layered master page.

48. The method of claim 47 wherein said duplicating comprises:
    creating a new layered master page; and
    copying objects in said selected layered master page into corresponding layers of said new layered master page.

49. The method of claim 28 further comprising exporting at least one selected layered master page as an export document.

50. The method of claim 49 wherein said at least one selected layered master page are the only pages of said export document.

51. The method of claim 28 further comprising importing at least one selected layered master page into a library of a current document.

* * * * *

UNITED STATES PATENT AND TRADEMARK OFFICE
CERTIFICATE OF CORRECTION

| | | |
|---|---|---|
| PATENT NO. | : 7,467,351 B1 | Page 1 of 1 |
| APPLICATION NO. | : 10/062576 | |
| DATED | : December 16, 2008 | |
| INVENTOR(S) | : David Spells et al. | |

It is certified that error appears in the above-identified patent and that said Letters Patent is hereby corrected as shown below:

Column 11, Claim 3, Line 47, delete the portion of text reading "effect objects;".

Column 13, Claim 29, Line 39, delete the portion of text reading "effect objects;".

Signed and Sealed this

Seventeenth Day of February, 2009

JOHN DOLL
*Acting Director of the United States Patent and Trademark Office*